United States Patent
Rix

(10) Patent No.: US 10,344,806 B2
(45) Date of Patent: Jul. 9, 2019

(54) SHAFT ASSEMBLY COMPRISING A FRANGIBLE COUPLING AND A FLEXIBLE COUPLING

(71) Applicant: ROLLS-ROYCE plc, London (GB)

(72) Inventor: Andrew Iain James Rix, Bristol (GB)

(73) Assignee: ROLLS-ROYCE plc, London (GB)

( * ) Notice: Subject to any disclaimer, the term of this patent is extended or adjusted under 35 U.S.C. 154(b) by 334 days.

(21) Appl. No.: 15/086,868

(22) Filed: Mar. 31, 2016

(65) Prior Publication Data

US 2016/0305490 A1 Oct. 20, 2016

(30) Foreign Application Priority Data

Apr. 20, 2015 (GB) .................................. 1506651.7

(51) Int. Cl.
*F16D 9/06* (2006.01)
*F16D 47/02* (2006.01)

(52) U.S. Cl.
CPC ............... *F16D 9/06* (2013.01); *F16D 47/02* (2013.01); *F05D 2260/311* (2013.01)

(58) Field of Classification Search
CPC .. F01D 21/04; F01D 21/045; F05D 2260/311; F16D 1/02; F16D 3/16; F16D 3/72; F16D 9/00; F16D 9/04; F16D 9/06; F16D 9/08; F16D 47/02
USPC ................ 464/32, 33, 88, 147, 182
See application file for complete search history.

(56) References Cited

U.S. PATENT DOCUMENTS

| | | | | |
|---|---|---|---|---|
| 2,278,997 A * | 4/1942 | Knight | ...................... | F16D 1/04 403/300 |
| 2,862,375 A * | 12/1958 | Miller | ...................... | F16D 9/00 192/30 R |
| 3,237,741 A * | 3/1966 | Gartner | ...................... | F16D 9/06 123/198 R |
| 3,427,826 A * | 2/1969 | Anderson | ................ | F16D 3/50 192/101 |
| 3,855,818 A * | 12/1974 | Hochreuter | ............... | F16D 9/06 464/33 |
| 3,975,923 A * | 8/1976 | Grimpe | .................... | F16D 9/04 403/2 |
| 3,982,408 A * | 9/1976 | Wright | ................... | F16D 3/185 464/154 |

(Continued)

FOREIGN PATENT DOCUMENTS

EP 1 382 805 A2 1/2004
EP 2 446 159 A1 5/2012

(Continued)

OTHER PUBLICATIONS

"Concentric." Merriam-Webster. [online], [retrieved on May 31, 2018]. Retrieved from the Internet <URL: https://www.merriam-webster.com/dictionary/concentric>.*

(Continued)

*Primary Examiner* — Josh Skroupa

(74) *Attorney, Agent, or Firm* — Oliff PLC

(57) ABSTRACT

A shaft assembly comprises a first shaft portion, connected to a second shaft portion by a flexible coupling. The first shaft portion is further connected to the second shaft portion by a frangible coupling with the frangible coupling being configured to fail if a torsional load through the frangible coupling exceeds a predetermined maximum torsional load. The flexible coupling allows an angular misalignment between the first and second shaft portions not exceeding a maximum angular misalignment.

12 Claims, 6 Drawing Sheets

(56) References Cited

U.S. PATENT DOCUMENTS

| | | | | | |
|---|---|---|---|---|---|
| 4,028,909 | A | * | 6/1977 | Jancic | F16D 1/02 285/2 |
| 4,201,513 | A | * | 5/1980 | Sales | F01D 21/045 415/9 |
| 4,265,099 | A | * | 5/1981 | Johnson | F16D 3/72 464/79 |
| 4,276,758 | A | * | 7/1981 | Coman | F16D 3/00 192/30 W |
| 4,347,715 | A | * | 9/1982 | Carman | B21B 33/00 285/2 |
| 4,354,850 | A | * | 10/1982 | Piepenbreier | B61C 9/46 464/32 |
| 4,389,202 | A | * | 6/1983 | Hochreuter | F16D 9/06 403/2 |
| 5,364,309 | A | * | 11/1994 | Heidrich | B23K 15/04 464/147 |
| 5,407,386 | A | * | 4/1995 | Kish | B64C 27/12 464/160 |
| 5,545,090 | A | * | 8/1996 | Kirschey | F16D 3/72 464/96 |
| 6,009,701 | A | * | 1/2000 | Freeman | F01D 21/045 384/624 |
| 6,068,452 | A | * | 5/2000 | Okada | F04B 27/0895 403/2 |
| 8,157,658 | B2 | * | 4/2012 | Langer | F16D 3/2237 464/145 |
| 8,986,127 | B2 | * | 3/2015 | Berthalon | F16D 3/10 403/349 |

FOREIGN PATENT DOCUMENTS

| | | |
|---|---|---|
| GB | 929323 A | 6/1963 |
| GB | 2 043 207 A | 10/1980 |
| WO | 2010/149731 A1 | 12/2010 |

OTHER PUBLICATIONS

Oct. 19, 2015 Search Report issued in British Patent Application No. 1506651.7.

Sep. 8, 2016 Search Report issued in European Patent Application No. 16162564.

* cited by examiner

SHAFT ASSEMBLY COMPRISING A FRANGIBLE COUPLING AND A FLEXIBLE COUPLING

This disclosure claims the benefit of UK Patent Application No. 1506651.7, filed on 20 Apr. 2015, which is hereby incorporated herein in its entirety.

FIELD OF THE DISCLOSURE

The present disclosure relates to a shaft assembly and particularly, but not exclusively, to a shaft assembly for a ducted fan gas turbine engine.

BACKGROUND TO THE DISCLOSURE

Aerospace turbofan engines are designed to withstand in-service loads arising from a variety of operational conditions. One such condition is the sudden release of a fan blade, which is termed a Fan Blade Off event. Such an event causes high impact loads which in turn must be accommodated by the pylon-engine-nacelle structure. The resulting force may be estimated from the following equation.

$$F_{fbo} = m\omega^2 r$$

Assuming a fan blade weight of 10 kg, a nominal rotational speed of 50 revolutions per second and a radius of 1 m, the fan blade off force becomes:

$$F_{fbo} = 10*(50*2\pi)^2*1$$

$$F_{fbo} = 9.86*10^5 N$$

It is known to incorporate a mechanical fuse element into the rotational part of the engine on medium to large turbofan engines to dissipate the significant force resulting from a Fan Blade Off event.

This mechanical fuse element is incorporated into the front bearing arrangement as shown in FIGS. 1A and 1B. When the fuse element breaks, the support stiffness drops significantly which causes a phase inversion in the equations of motion for the shaft assembly. This results in the out of balance forces generated by the release of the fan blade being reacted primarily by the inertia of the fan assembly, which requires that the rotor orbit (e) must be large.

Together with the inertia reaction, a gyroscopic moment is generated by the precession of the shaft assembly axis (angle α).

In this arrangement, the gyroscopic moment makes a smaller contribution to opposing the out of balance forces generated by the Fan Blade Off event.

Statements of Disclosure

According to a first aspect of the present disclosure there is provided a shaft assembly, the shaft assembly comprising:
a first shaft portion, connected to a second shaft portion by a flexible coupling,
the first shaft portion being further connected to the second shaft portion by a frangible coupling, the frangible coupling being configured to fail if a bending load across the frangible coupling exceeds a predetermined maximum bending load,
the flexible coupling allowing an angular misalignment between the first and second shaft portions not exceeding a maximum angular misalignment.

The shaft assembly of the disclosure moves the mechanical fuse element into the shaft to release a rotational degree of freedom, in contrast to the prior art arrangement of releasing a radial degree of freedom.

Following the loss of a fan blade and the corresponding failure of the frangible coupling, the radial supporting stiffness of the fan shaft assembly becomes very low. This results in the natural frequencies of the fan shaft assembly (that in turn are governed by the relationship between the dynamic stiffness and the dynamic inertia forces) likewise being very low. In this situation, the fan shaft assembly is said to be operating 'super critically', which means that its rotational speed is greater than its resonant speed.

When the fan shaft assembly is operating in this 'super critical' region, the inertia force is much larger than the stiffness force and so the fan shaft assembly will rotate about its centre of inertia which is significantly radially offset by the loss of the fan blade.

The gyroscopic couple generated by the angular precession of the fan shaft assembly introduces a moment at 90° to the precession which acts similarly to a stiffness. With the frangible coupling being close to the fan at the end of the fan shaft assembly, the size of the gyroscopic couple that is generated becomes significantly larger than the gyroscopic couple generated with the prior art fusing technique. Consequently, the magnitude of this gyroscopic couple is sufficiently large as to be able to provide support to the fan portion of the fan shaft assembly.

This means that the gyroscopic forces resulting from the failure of the frangible coupling can be tailored by adjusting by the axial distance of the frangible coupling hinge point from the centre of inertia of the fan portion of the fan shaft assembly. The gyroscopic forces can therefore be used to control the orbit size and the natural frequencies of the fan portion. The natural frequencies of the system are very difficult to adjust by traditional design but are critical on run down following fan blade off to avoid other natural frequencies (i.e. the engine structure on the wing) or operational speeds (i.e. 'windmilling' operation).

By allowing an axial misalignment between the first and second shaft portions, a significantly greater precession angle is provided. This in turn results in a much greater gyroscopic moment that resists the out of balance forces generated by the Fan Blade Off event.

Optionally, the shaft assembly further comprises an axial load carrying element, and wherein the axial load carrying element provides an axial connection between the first shaft portion and the second shaft portion.

The axial load carrying element provides increased axial strength in the shaft assembly. This assists in ensuring that the frangible coupling does not fail under axial thrust loading. This in turn ensures that the frangible coupling fails only under the action of a bending moment load that exceeds a pre-determined value.

Optionally, the first and second shaft portions are arranged in axial series and the frangible coupling extends axially between the first and second shaft portions.

In one arrangement, the first and second shaft portions are connected in axial series with the frangible coupling extending axially between corresponding opposing ends of the first and second shaft portions. This arrangement is simple and cost effective to produce.

Optionally, wherein the first and second shaft portions are arranged concentrically and the frangible coupling extends radially between the first and second shaft portions.

In another arrangement, the first shaft portion is concentric with the second shaft portion with the frangible coupling extending in a radial plane between the first and second shaft portions.

This allows for a more compact shaft assembly because the axial length of the shaft assembly can be reduced.

Optionally, the flexible coupling comprises an axial load carrying element.

In another arrangement, the flexible coupling takes the form of a ball and socket joint that combines angular articulation with the ability to withstand axial loading. Such an arrangement may be more compact and weight efficient but is likely to be more costly than an arrangement with discrete flexible coupling and axial load carrying element.

Optionally, the flexible coupling is a membrane coupling.

A membrane coupling provides articulations through bending of the radially extending membranes while also providing for axial alignment. Such an arrangement is simple and cost effective.

The membrane coupling also provides an aligning stiffness which opposes the misalignment of the first and second shaft portions. This stiffness would act to increase natural frequencies and support the fan portion of the fan shaft assembly against gravity at low rotational speeds, such as during 'windmilling'.

Optionally, the flexible coupling is a constant velocity joint.

A constant velocity joint (such as a Rzeppa joint) allows rotation of the shaft assembly when the first and second shaft portions are misaligned without consequent rotational speed variation.

Optionally, the constant velocity joint incorporates a ratchet assembly, the ratchet assembly allowing angular movement of the constant velocity joint in only one angular direction.

Following failure of the frangible coupling, the ratchet assembly permits angular movement of the constant velocity joint but prevents this movement from being reversed. This ensures that once the fan portion of the fan shaft assembly has moved in an angular sense it is constrained by the ratchet assembly to stay in this orientation while the rotational speed of the shaft assembly reduces to 'windmilling'.

Optionally, the shaft assembly further comprises a bump stop, wherein the bump stop limits the angular axial misalignment between the first and second shaft portions.

Providing a limit to the angular misalignment between the first and second shaft portions helps to prevent egress of the fan assembly from the engine nacelle.

Optionally, the bump stop comprises one or more resilient elements.

The use of resilient elements reduces the magnitude of reaction loads arising from the angular misalignment between the first and second shaft portions reaching its maximum extent.

Optionally, the frangible coupling is concentric with the flexible coupling.

In another arrangement, the frangible coupling is positioned concentrically with and radially inwardly of the flexible coupling. This makes the shaft assembly more compact and weight efficient.

According to a second aspect of the present disclosure there is provided a gas turbine engine comprising a shaft assembly as claimed in the first aspect.

Other aspects of the disclosure provide devices, methods and systems which include and/or implement some or all of the actions described herein. The illustrative aspects of the disclosure are designed to solve one or more of the problems herein described and/or one or more other problems not discussed.

BRIEF DESCRIPTION OF THE DRAWINGS

There now follows a description of an embodiment of the disclosure, by way of non-limiting example, with reference being made to the accompanying drawings in which.

It is noted that the drawings may not be to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1A:
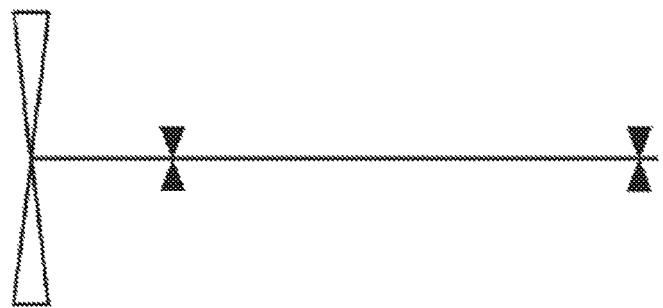
FIG. 1A shows a schematic view of a shaft assembly of a turbofan engine, according to the prior art.
Figure 1B:
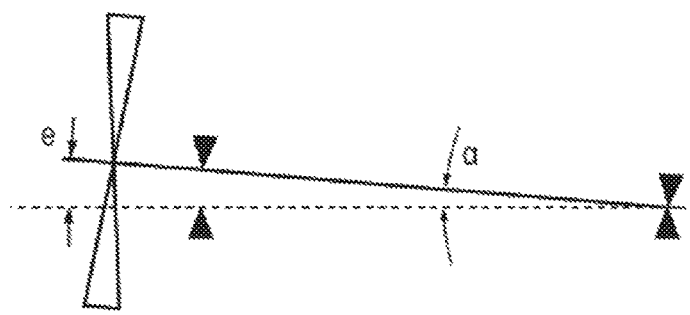
FIG. 1B shows a schematic view of a shaft assembly of a turbofan engine, according to the prior art.
Figure 2:
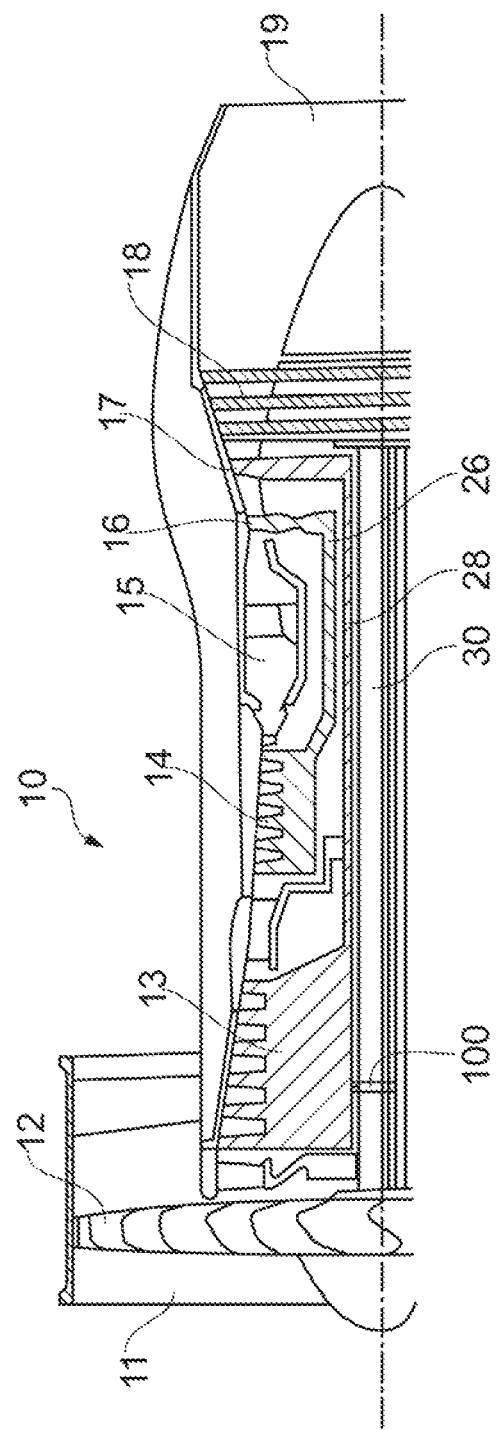
FIG. 2 shows a schematic sectional view of a turbofan gas turbine engine incorporating a shaft assembly according to an aspect of the present disclosure.

A turbofan gas turbine engine 10, as shown in FIG. 2, comprises in flow series an intake 11, a fan 12, an intermediate pressure compressor 13, a high pressure compressor 14, a combustion chamber 15, a high pressure turbine 16, an intermediate pressure turbine 17, a low pressure turbine 18 and an exhaust 19. The high pressure turbine 16 is arranged to drive the high pressure compressor 14 via a first shaft 26. The intermediate pressure turbine 17 is arranged to drive the intermediate pressure compressor 13 via a second shaft 28 and the low pressure turbine 18 is arranged to drive the fan 12 via a third shaft 30. In operation air flows into the intake 11 and is compressed by the fan 12. A first portion of the air flows through, and is compressed by, the intermediate pressure compressor 13 and the high pressure compressor 14 and is supplied to the combustion chamber 15. Fuel is injected into the combustion chamber 15 and is burnt in the air to produce hot exhaust gases which flow through, and drive, the high pressure turbine 16, the intermediate pressure turbine 17 and the low pressure turbine 18. The hot exhaust gases leaving the low pressure turbine 18 flow through the exhaust 19 to provide propulsive thrust. A second portion of the air bypasses the main engine to provide propulsive thrust.

Typically, the third shaft 30 that connects the fan 12 to the low pressure turbine 18 will incorporate a shaft assembly according to an aspect of the present disclosure.

Figure 3:
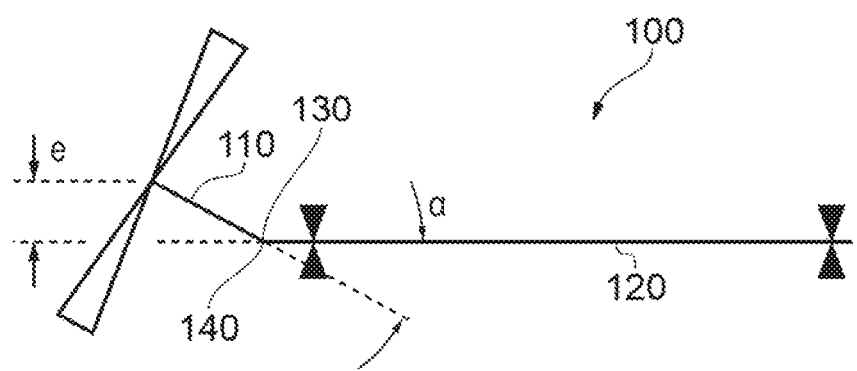
FIG. 3 shows a schematic view of a shaft assembly of a turbofan engine, according to a first embodiment of the disclosure.
Figure 4A:
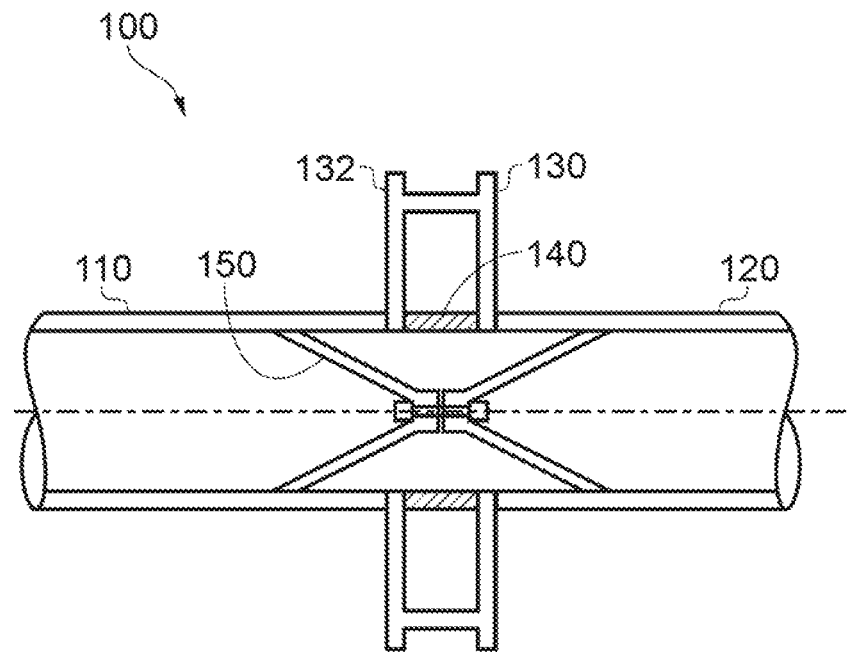
FIG. 4A shows a schematic arrangement of the shaft assembly of FIG. 2 during normal operation.
Figure 4B:
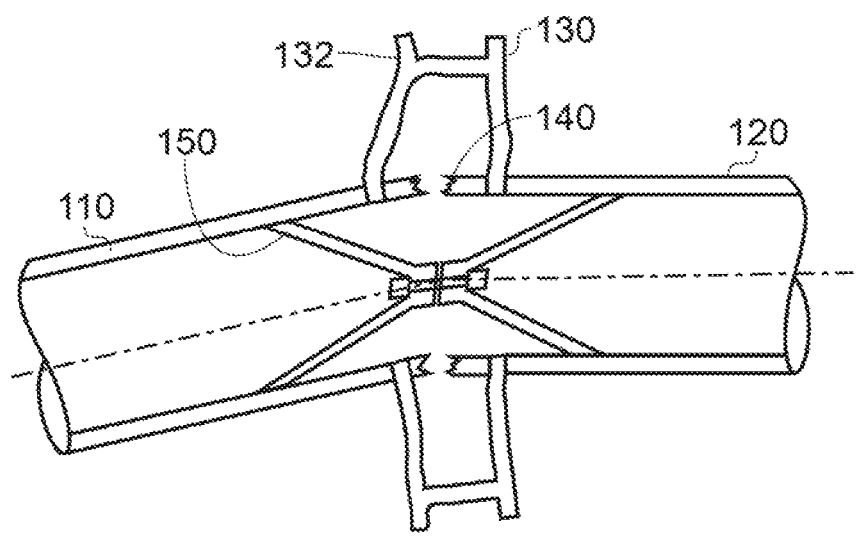
FIG. 4B shows the schematic arrangement of FIG. 4A following failure of the frangible soupling.

Referring to FIGS. 3, 4A, and 4B, a shaft assembly according to a first embodiment of the disclosure is designated generally by the reference numeral 100.

The shaft assembly 100 comprises a first shaft portion 110 and a second shaft portion 120. The first shaft portion 110 is connected in axial series with the second shaft portion 120 by a flexible coupling 130. The flexible coupling 130 is configured to permit angular misalignment between the first shaft portion 110 and the second shaft portion 120 up to a predetermined maximum angular misalignment value.

Each of the first shaft portion 110 and the second shaft portion 120 is formed from a high strength steel alloy.

In this arrangement (shown in FIG. 4A), the flexible coupling 130 is a membrane coupling 132. A membrane coupling 132 is a conventional mechanical coupling that is used to connect shafts which are angularly misaligned to one another. The membrane coupling 132 is typically also formed from a high strength steel alloy. Alternatively, the membrane coupling 132 may be formed from another metal alloy, such as a titanium alloy.

The first shaft portion 110 is further connected to the second shaft portion 120 by a frangible coupling 140. The frangible coupling 140 is configured to fail if a bending load across the frangible coupling 140 exceeds a pre-determined maximum bending load.

In this arrangement the frangible coupling 140 is arranged concentrically with and radially inwardly of the membrane coupling 132, and extends axially between the first shaft portion 110 and the second shaft portion 120. The frangible coupling 140 is formed from a metallic ring that is attached to each of the first shaft portion 110 and the second shaft portion 120, for example by welding. In other arrangements, the frangible coupling 140 may be connected to each of the first and second shaft portions 110,120 by an alternative connection means, for example by using bolted flanges.

The shaft assembly 110 further comprises an axial load carrying element 150 that also connects the first shaft portion 110 to the second shaft portion 120. In this arrangement the axial load carrying element 150 is formed as a articulated linkage. In other arrangements, the axial load carrying element 150 may be formed as a flexible cable.

In normal operation of the shaft assembly 100, torque is transmitted between the first shaft portion 110 and the second shaft portion 120 through the frangible coupling 140.

After a Fan Blade Off event, the frangible coupling 140 will fail (as shown in FIG. 4B), allowing the first shaft portion 110 to become angularly misaligned relative to the second shaft portion 120. The fan along the first shaft portion 110 will then precess around the flexible coupling 132 with the radially extending side members of the flexing to accommodate this angular misalignment.

The gyroscopic force created by the precession of the first shaft portion 110 will ameliorate the out of balance forces generated by the release of the fan blade.

The angular misalignment between the first shaft portion 110 and the second shaft portion 120 will be limited by contact between the axially opposing end portions of the first and second shaft portions 110,120, acting as a bump stop.

Figure 5:
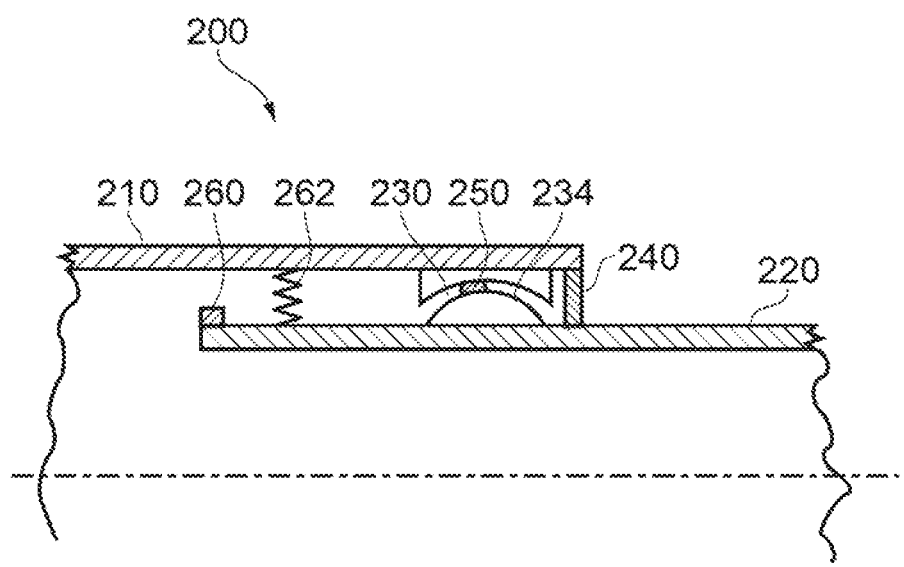
FIG. 5 shows a schematic arrangement of a shaft assembly according to a second embodiment of the disclosure.

Referring to FIG. 5, a shaft assembly according to a second embodiment of the disclosure is designated generally by the reference numeral 200.

The shaft assembly 200 has a first shaft portion 210 and a second shaft portion 220. The first shaft portion 210 is arranged concentrically with the second shaft portion 220, with an end of the second shaft portion 120 being accommodated within a corresponding end of the first shaft portion 110.

In this arrangement, the first shaft portion 210 is connected to the second shaft portion 120 by a flexible coupling 230 in the form of a constant velocity joint 234. The constant velocity joint 234 is configured to permit angular misalignment between the first shaft portion 210 and the second shaft portion 220 up to a predetermined maximum angular misalignment value.

As described above in relation to the first embodiment, the first shaft portion 210 is further connected to the second shaft portion 220 by a frangible coupling 240. The frangible coupling 240 is configured to fail if a bending load across the frangible coupling 240 exceeds a pre-determined maximum bending load.

In this arrangement the frangible coupling 240 extends radially between the first shaft portion 210 and the second shaft portion 220. The frangible coupling 240 is formed from a metallic ring that is attached to each of the first shaft portion 210 and the second shaft portion 220, for example by welding.

The constant velocity joint 234, in addition to accommodating axial misalignment between the first and second shaft portions 210,220, also provides an axial load carrying capability.

This embodiment also comprises a bump stop 260. The bump stop 260 is formed as a radially outwardly projecting rim on the end of the second shaft portion 220 that is accommodated within the end of the first shaft portion 210. The bump stop 260 acts to limit the angular misalignment between the first and second shaft portions 210,220 and so minimise frictional contact between the remaining fan blades of the fan assembly 12 the nacelle structure surrounding the fan assembly 12, when the angular misalignment has reached its predetermined maximum value.

As outlined above in respect of the first embodiment, during normal operation of the shaft assembly 200, torque is transmitted between the first shaft portion 210 and the second shaft portion 220 through the frangible coupling 240.

Failure of the frangible coupling 240, for example after a Fan Blade Off event, will allow the first shaft portion 210 to become angularly misaligned relative to the second shaft portion 220. The fan along the first shaft portion 210 will then precess around the flexible coupling 232 with the constant velocity joint 234 accommodating this angular misalignment.

The gyroscopic force created by the precession of the combined fan and first shaft portion 210 will ameliorate the out of balance forces generated by the release of the fan blade.

Figure 6:
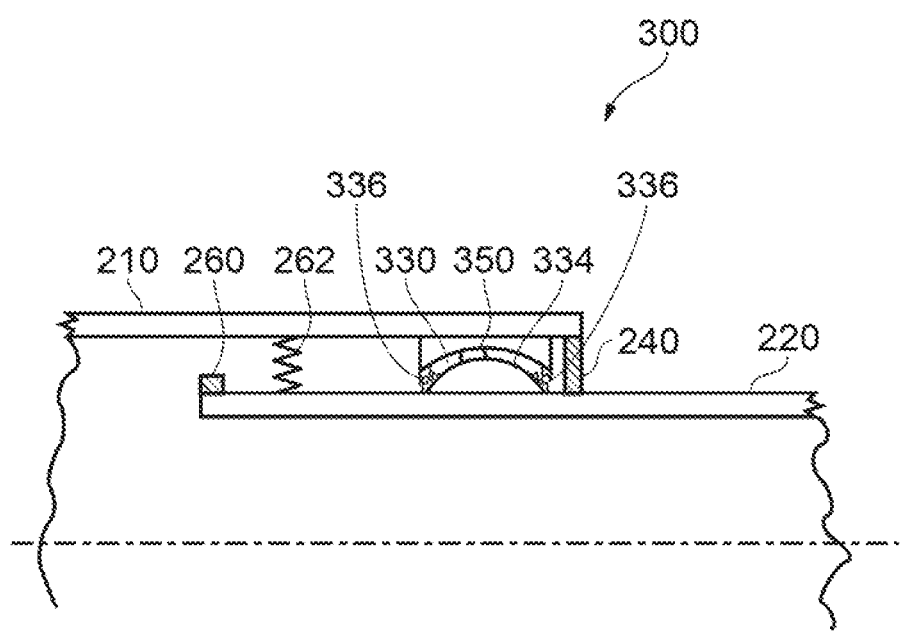
FIG. 6 shows a schematic arrangement of a shaft assembly according to a third embodiment of the disclosure.

Referring to FIG. 6, a shaft assembly according to a third embodiment of the disclosure is designated generally by the reference numeral 300. Features of the shaft assembly 300 which correspond to those of shaft assembly 200 have been given corresponding reference numerals for ease of reference.

The shaft assembly 300 has a first shaft portion 210 and a second shaft portion 220; the first shaft portion 210 being arranged concentrically with the second shaft portion 220. The frangible coupling 240 extends radially between the first shaft portion 110 and the second shaft portion 120.

As described above in respect of the second embodiment, the first shaft portion 210 is connected to the second shaft portion 220 by a flexible coupling 330 in the form of a constant velocity joint 334. The constant velocity joint 334 is configured to permit angular misalignment between the first shaft portion 210 and the second shaft portion 220 up to a predetermined maximum angular misalignment value.

As described above in relation to the first embodiment, the first shaft portion 210 is further connected to the second shaft portion 220 by a frangible coupling 240. The frangible coupling 240 is configured to fail if a bending load across the frangible coupling 240 exceeds a pre-determined maximum bending load.

The constant velocity joint 334, in addition to accommodating axial misalignment between the first and second shaft portions 210,220, and providing an axial load carrying capability, also incorporates a ratchet assembly 336.

The ratchet assembly 336 is configured to actuate only once the angular misalignment between the first and second shaft portions 210,220 exceeds a minimum value. In other words, the ratchet assembly 336 becomes operative only after a shaft breakage event.

As outlined above in respect of the first and second embodiments, during normal operation of the shaft assembly 300, torque is transmitted between the first shaft portion 210 and the second shaft portion 220 through the frangible coupling 240.

Failure of the frangible coupling 240, for example after a Fan Blade Off event, will allow the first shaft portion 210 to become angularly misaligned relative to the second shaft portion 220. The ratchet assembly 336 will then operate to keep the first and second shaft portions 210,220 in their angularly misaligned state.

After failure of the frangible coupling, the inertia of the fan portion of the fan shaft assembly will be the dominating force and therefore the fan portion will orbit around its new centre of inertia (i.e. now radially offset due to the missing fan blade). In this state the shaft assembly will run producing low forces in the structure. If the ratchet did not engage, when the shaft assembly slows down it will pass through its natural frequency and start to operate in a "sub-critical" manner where the centre of inertia will be pulled by the unbalance force towards the blade off unbalance, articulating the frangible coupling in the opposite direction and causing the fan portion inertia radial offset to add to the already very large unbalance from the missing fan blade. This will generate very large centrifugal forces which will have to be reacted entirely by the engine/aircraft structure. If the ratchet is engaged while at a super-critical speed the fan portion of the fan shaft assembly will be locked to rotate around its offset centre of inertia and will not generate any force from unbalance even when operating below resonance.

The fan along the first shaft portion 210 will then precess around the flexible coupling 232 with the constant velocity joint 234 accommodating this angular misalignment.

The foregoing description of various aspects of the disclosure has been presented for purposes of illustration and description. It is not intended to be exhaustive or to limit the disclosure to the precise form disclosed, and obviously, many modifications and variations are possible. Such modifications and variations that may be apparent to a person of skill in the art are included within the scope of the disclosure as defined by the accompanying claims.

The invention claimed is:

1. A shaft assembly comprising:
a first shaft portion connected to a second shaft portion by a flexible coupling, the first shaft portion being further connected to the second shaft portion by a frangible coupling,
the frangible coupling being configured to fail upon a bending load across the frangible coupling exceeding a predetermined maximum bending load, and
the flexible coupling being configured to transmit torque between the first shaft portion and the second shaft portion after failure of the frangible coupling, the failure of the frangible coupling causing the first shaft portion and the second shaft portion to become angularly misaligned with each other, the misalignment not exceeding a maximum angular misalignment.

2. The shaft assembly as claimed in claim 1, further comprising an axial load carrying element providing an axial connection between the first shaft portion and the second shaft portion.

3. The shaft assembly as claimed in claim 1, wherein the first and second shaft portions are arranged in axial series and the frangible coupling extends axially between the first and second shaft portions.

4. The shaft assembly as claimed in claim 1, wherein the first and second shaft portions are arranged concentrically and the frangible coupling extends radially between the first and second shaft portions.

5. The shaft assembly as claimed in claim 1, wherein the flexible coupling includes an axial load carrying element.

6. The shaft assembly as claimed in claim 1, wherein the flexible coupling is a membrane coupling.

7. The shaft assembly as claimed in claim 1, wherein the flexible coupling is a constant velocity joint.

8. The shaft assembly as claimed in claim 7, wherein the constant velocity joint includes a ratchet assembly, the ratchet assembly restricting angular movement of the constant velocity joint to only one angular direction.

9. The shaft assembly as claimed in claim 1, further comprising a bump stop, wherein the bump stop limits the angular axial misalignment between the first and second shaft portions.

10. The shaft assembly as claimed in claim 9, wherein the bump stop includes one or more resilient elements.

11. The shaft assembly as claimed in claim 1, wherein the frangible coupling is concentric with the flexible coupling.

12. A gas turbine engine comprising the shaft assembly as claimed in claim 1.

* * * * *